United States Patent
Aley-Raz et al.

(10) Patent No.: US 8,442,824 B2
(45) Date of Patent: May 14, 2013

(54) DEVICE, SYSTEM, AND METHOD OF LIVENESS DETECTION UTILIZING VOICE BIOMETRICS

(75) Inventors: Almog Aley-Raz, Varburg (IL); Nir Moshe Krause, Herzelin (IL); Michael Itzhak Salmon, Cambridge (GB); Ran Yehoshua Gazit, Ra'anana (IL)

(73) Assignee: Nuance Communications, Inc., Burlington, MA (US)

( * ) Notice: Subject to any disclaimer, the term of this patent is extended or adjusted under 35 U.S.C. 154(b) by 704 days.

(21) Appl. No.: 12/591,636

(22) Filed: Nov. 25, 2009

(65) Prior Publication Data

US 2010/0131273 A1 May 27, 2010

Related U.S. Application Data

(60) Provisional application No. 61/193,421, filed on Nov. 26, 2008.

(51) Int. Cl.
*G10L 17/00* (2006.01)

(52) U.S. Cl.
USPC .............................. 704/247; 704/250; 704/252

(58) Field of Classification Search .................. 704/250, 704/246, 247, 273, 275, 235, 249, 251, 252, 704/257, 270, 270.1; 455/273
See application file for complete search history.

(56) References Cited

U.S. PATENT DOCUMENTS

| | | | |
|---|---|---|---|
| 4,998,279 A | 3/1991 | Weiss | |
| 5,897,616 A | 4/1999 | Kanevsky | |
| 6,356,868 B1 * | 3/2002 | Yuschik et al. | 704/246 |
| 7,130,452 B2 | 10/2006 | Bolle et al. | |
| 7,158,776 B1 * | 1/2007 | Estes et al. | 455/411 |
| 7,222,072 B2 * | 5/2007 | Chang | 704/250 |
| 7,386,448 B1 * | 6/2008 | Poss et al. | 704/247 |
| 7,447,633 B2 | 11/2008 | Navratil et al. | |
| 8,099,288 B2 * | 1/2012 | Zhang et al. | 704/275 |
| 8,190,437 B2 * | 5/2012 | Farrell et al. | 704/273 |
| 8,332,223 B2 | 12/2012 | Farrell et al. | |
| 2002/0002465 A1 | 1/2002 | Maes | |
| 2006/0287863 A1 | 12/2006 | Santos et al. | |
| 2007/0106517 A1 | 5/2007 | Cluff et al. | |
| 2008/0312926 A1 | 12/2008 | Vair et al. | |
| 2012/0239398 A1 | 9/2012 | Farrell et al. | |

FOREIGN PATENT DOCUMENTS

EP 0856836 A2 8/1998

OTHER PUBLICATIONS

International Search Report for PCT/IB2009/055352 dated Jun. 17, 2010.
Application Serial No. EP 09828719 Search Report mailed on Oct. 9, 2012.

* cited by examiner

*Primary Examiner* — Huyen X. Vo
(74) *Attorney, Agent, or Firm* — Wolf, Greenfield & Sacks, P.C.

(57) ABSTRACT

Device, system, and method of liveness detection using voice biometrics. For example, a method comprises: generating a first matching score based on a comparison between: (a) a voice-print from a first text-dependent audio sample received at an enrollment stage, and (b) a second text-dependent audio sample received at an authentication stage; generating a second matching score based on a text-independent audio sample; and generating a liveness score by taking into account at least the first matching score and the second matching score.

17 Claims, 4 Drawing Sheets

DEVICE, SYSTEM, AND METHOD OF LIVENESS DETECTION UTILIZING VOICE BIOMETRICS

PRIOR APPLICATION DATA

This patent application claims priority and benefit from U.S. Provisional Patent Application No. 61/193,421, filed on Nov. 26, 2008, which is hereby incorporated by reference in its entirety.

FIELD

Some embodiments are related to the field of voice biometrics.

BACKGROUND

Some electronic systems and communication systems utilize biometrics, for example, methods which may be able to uniquely identify or recognize a particular person based on one or more intrinsic physical or behavioral traits. Such traits may include, for example, fingerprint, palm geometry, face recognition, iris or retina recognition, voice (e.g., speaker recognition), or other physiological characteristics, behavioral characteristics, "behaviometrics", or the like.

Some systems may utilize biometrics, for example, for identity access management, for access control, or to identify an individual who is under surveillance. Some systems utilize biometrics for verification purposes; for example, the system performs a one-to-one comparison of a newly-captured biometric sample or utterance with a previously-stored sample or voice-print, in order to verify that the person is indeed the individual that he claims to be. Some systems utilize biometrics for recognition purposes; for example, the system performs a one-to-many comparison of a newly-captured biometric sample against a database of previously-captured biometric samples of multiple persons, in an attempt to identify an unknown individual.

Some systems of speaker recognition may utilize Text-Dependent (TD) methods or Text-Independent (TI) methods. For example, in a text-dependent method, an enrollment stage requires the speaker to say a particular phrase; the method then extracts features from the captured voice sample; and a subsequent verification or authentication stage requires the speaker to say, again, that particular phrase. A text-dependent method may be exposed to some security breaches; for example, an eavesdropper may intercept and record the authentic user uttering the pass-phrase (e.g., during the enrollment stage, during verification stage, or by doing "voice phishing" at a later point in time), and the eavesdropper may subsequently attempt to playback the recorded utterance, posing to be the authentic user.

In contrast, in a text-independent method, the phrase spoken during the enrollment stage is different from the phrase spoken during the verification stage; and the enrolment stage may be performed even without the actual knowledge of the user.

SUMMARY

Some embodiments include, for example, devices, systems, and methods of liveness detection using voice biometrics.

In some embodiments, for example, a method comprises: generating a first matching score based on a comparison between: (a) a voice-print from a first text-dependent audio sample received at an enrollment stage, and (b) a second text-dependent audio sample received at an authentication stage; generating a second matching score based on a text-independent audio sample; and generating a liveness score by taking into account at least the first matching score and the second matching score.

In some embodiments, for example, generating the second matching score comprises: generating the second matching score based on a comparison between: (i) a voice-print from said second text-dependent audio sample received at said authentication stage, and (ii) said text-independent audio sample received at a liveness detection stage.

In some embodiments, for example, generating the second matching score comprises: generating a first interim score based on a comparison between: (1) the text-independent audio sample received at said authentication stage, and (2) a text-independent voice-print of said text-independent audio sample received at said liveness detection stage; generating a second interim score based on a comparison between: (A) the text-independent audio sample received at said liveness detection stage, and (B) a text-independent voice-print of said text-independent audio sample received at said authentication stage; and generating said second matching score based on at least said first interim score and said second interim score.

In some embodiments, for example, the method comprises: generating an utterance validation score based on said text-independent audio sample received at a liveness detection stage.

In some embodiments, for example, generating the liveness score comprises: generating the liveness score by taking into account at least the first matching score, the second matching score, and the utterance validation score.

In some embodiments, for example, generating the utterance validation score comprises: applying an Automatic Speech Recognition algorithm to generate said utterance validation score.

In some embodiments, for example, at least one of the first matching score and the second matching score comprises a binary value.

In some embodiments, for example, at least one of said enrollment stage, said authentication stage and said liveness detection stage is performed over a telephonic communication channel.

In some embodiments, for example, wherein generating the second matching score based on the text-independent audio sample comprises: pseudo-randomly selecting a phrase from a plurality of pre-defined phrases; and prompting a user to say said phrase.

In some embodiments, for example, a system comprises: a speaker recognition sub-system, to generate a first matching score based on a comparison between: (a) a voice-print from a first text-dependent audio sample received at an enrollment stage, and (b) a second text-dependent audio sample received at an authentication stage; to generate a second matching score based on a text-independent audio sample; and to generate a liveness score by taking into account at least the first matching score and the second matching score.

In some embodiments, for example, the speaker recognition sub-system is to generate the second matching score based on a comparison between: (i) a voice-print from said second text-dependent audio sample received at said authentication stage, and (ii) said text-independent audio sample received at a liveness detection stage.

In some embodiments, for example, the speaker recognition sub-system is to: generate a first interim score based on a comparison between: (1) the text-independent audio sample received at said authentication stage, and (2) a text-independent voice-print of said text-independent audio sample received at said liveness detection stage; generate a second interim score based on a comparison between: (A) the text-independent audio sample received at said liveness detection stage, and (B) a text-independent voice-print of said text-independent audio sample received at said authentication stage; and generate said second matching score based on at least said first interim score and said second interim score.

In some embodiments, for example, the speaker recognition sub-system is to generate an utterance validation score based on said text-independent audio sample received at a liveness detection stage.

In some embodiments, for example, the speaker recognition sub-system is to generate the liveness score by taking into account at least the first matching score, the second matching score, and the utterance validation score.

In some embodiments, for example, the speaker recognition sub-system is to apply an Automatic Speech Recognition algorithm to generate said utterance validation score.

In some embodiments, for example, at least one of the first matching score and the second matching score comprises a binary value.

In some embodiments, for example, at least one of said enrollment stage, said authentication stage and said liveness detection stage is performed over a telephonic communication channel.

In some embodiments, for example, the speaker recognition sub-system is to generate the second matching score based on the text-independent audio sample by pseudo-randomly selecting a phrase from a plurality of pre-defined phrases, and prompting a user to say said phrase.

In some embodiments, for example, a speaker recognition module comprises: a text-dependent enrollment module to capture a text-dependent audio sample during an enrollment stage, and to generate from the text-dependent audio sample a text-dependent voice signature during said enrollment stage; a text-dependent audio acquisition module to acquire a text-dependent audio sample during an authentication stage; a text-dependent authentication module to generate a first score based on a comparison between: (a) the text-dependent voice signature generated during said enrollment stage, and (b) the text-dependent audio sample acquired during said authentication stage; a text-independent audio acquisition module to acquire a text-independent audio sample during a liveness detection stage by prompting a user to say a phrase selected pseudo-randomly from a pool of pre-defined phrases; a text-independent authentication module to generate a second score based at least on a comparison between: (1) said text-independent audio sample acquired during said liveness detection stage, and (2) a text independent voice signature generated from said text-dependent audio sample acquired during said authentication stage; an utterance validation module to generate a validation score corresponding to validity of said text-independent audio sample acquired during said liveness detection stage; and a fusion module to generate a liveness detection score based on at least said first score, said second score, and sail validation score.

In some embodiments, for example, the text-independent authentication module comprises: a first text-independent enrollment module to generate a first text-independent voice print based on a text-dependent audio sample acquired during said authentication stage; a second text-independent enrollment module to generate a second text-independent voice print based on the text-independent audio sample acquired during the liveness detection stage; a first text-independent authentication unit to generate a first interim matching score based on a comparison between: (i) the first text-independent voice print, and (ii) the text-independent audio sample acquired during the liveness detection stage; a second text-independent authentication unit to generate a second interim matching score based on a comparison between: (i) the second text-independent voice print, and (ii) the text-independent audio sample acquired during the authentication stage; and a combination module to generate said second score based on the first interim matching score and the second interim matching score.

Some embodiments may include, for example, a computer program product including a computer-useable medium including a computer-readable program, wherein the computer-readable program when executed on a computer causes the computer to perform methods in accordance with some embodiments.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
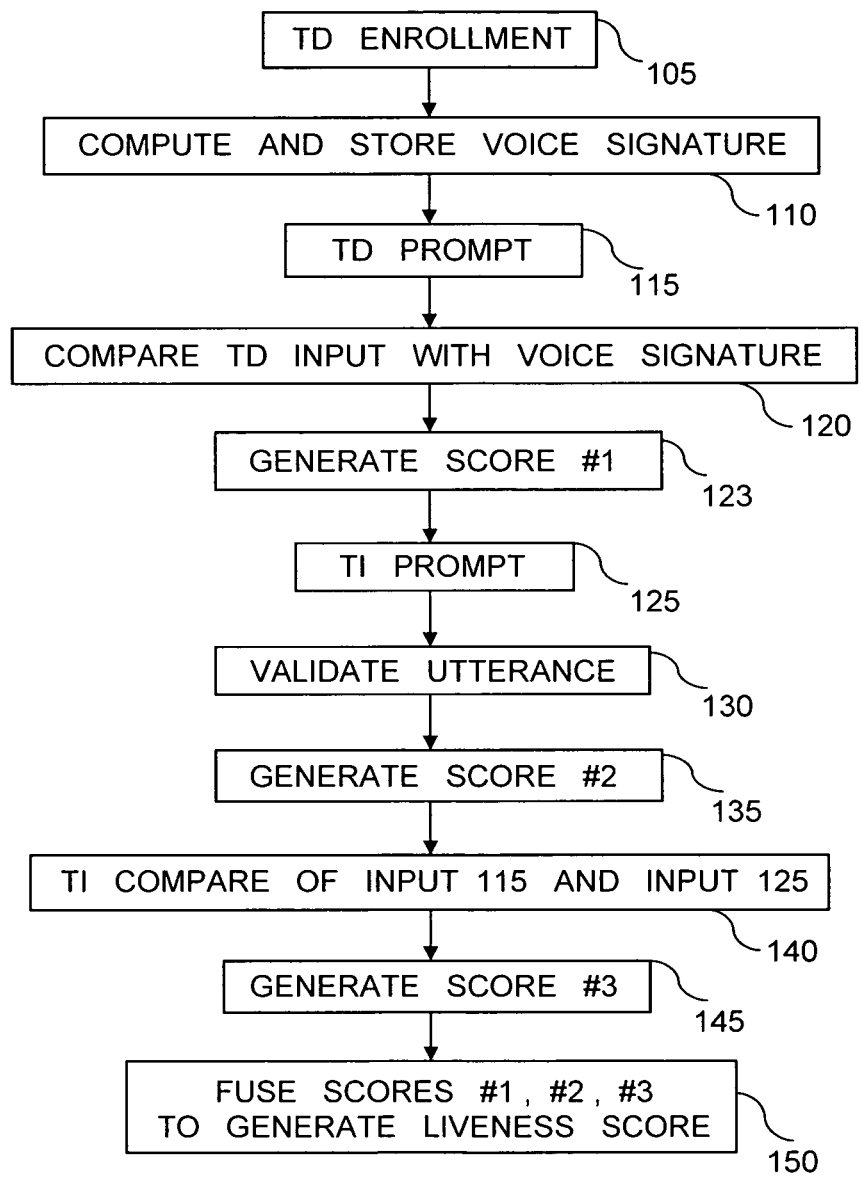
FIG. 1 is a schematic flow-chart of a method of speaker recognition, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smartphone" device, a wired or wireless handheld device (e.g., BlackBerry®, Palm® Treo™), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), ZigBee™, Ultra-Wideband (UWB), Global System for Mobile communication (GSM), 2 G, 2.5G, 3G, Third Generation Partnership Project (3GPP), 3GPP Long Term Evolution (LTE), 3.5G, or the like. Some embodiments may be used in conjunction with various other devices, systems and/or networks.

The terms "wireless device", "wireless computing device", "mobile device" or "mobile computing device" as used herein include, for example, a device capable of wireless communication, a communication device or communication station capable of wireless communication, a computer or electronic device capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like.

At an overview, some embodiments include devices, systems, and methods of liveness detection using voice biometrics. Some embodiments allow speaker recognition, and may utilize intra-session voice variation.

Some embodiments include, for example, a method for detecting whether or not a speaker attempting to be authenticated in a voice biometric system is authentic and/or 'alive', as opposed to a fraudster or an attacker or an eavesdropper utilizing recordings of the authentic person. The method may utilize a combination of text-independent and text-dependent voice biometrics techniques, in conjunction with speech recognition and/or utterance validation technology, for measuring the variation in the speaker's voice across a single session.

In some embodiments, voice biometrics allow authentication of individuals based on their voice characteristics. The voice characteristics may be extracted from a sample or several samples of the speaker's voice, and may be analyzed and the n stored in a data repository. The data stored in the repository may be referred to as "voice signature" or "voice print". The voice signature holds the parameters of a mathematical model that describes the voice characteristics of the speaker. The process of obtaining one or more voice samples from the speaker, computing and storing the voice signature, may be referred to as "enrollment".

In some embodiments, during an authentication phase, the speaker is asked to provide one or more additional voice samples. These voice samples are compared with a voice signature, and the degree of match between the newly-acquired voice samples and the previously-stored voice signature is computed. A "degree of match" or confidence level may be referred to as "score" or "similarity score". By comparing the score to a threshold value, the system may decide whether or not the speaker to be authenticated is indeed the same speaker whose voice characteristics are modeled in the voice signature.

Some embodiments may utilize text-independent speaker recognition methods, in which enrolment and verification are based on substantially unconstrained natural speech. The voice signature may model the speaker's voice, regardless of (or independently of) the specific text used during enrollment. In some embodiments, the text used for authentication may be substantially unrestricted, too.

Some embodiments may be used in conjunction with text-dependent speaker recognition methods, in which a speaker enrolls by uttering a specific pass-phrase or a set of pass-phrases, and is later prompted to repeat one or more of the pass-phrases during the authentication stage. The voice signature captures both the speaker's voice characteristics as well as the characteristics of the specific phrase or phrases used for enrollment. During the authentication stage, the speaker is required to repeat the same phrase or phrases used for enrollment.

Some embodiments may be utilized in conjunction with text-prompted speaker recognition methods, in which the enrollment stage utilizes audio samples that include isolated atoms of speech (for example, digits, letters or words) or combinations of them; and the authentication stage is based on prompting the speaker for random or pseudo-random combinations of these atoms of speech. The voice signature captures both the speaker's voice characteristics as well as the characteristics of the individual atoms of speech used for enrollment. During the authentication stage, the speaker may be required to repeat a combination of the same atoms of speech used for enrollment.

Some conventional systems of text-dependent speaker recognition are exposed to risks from a fraudster or attacker who may attempt to utilize voice recordings of a legitimate speaker, in order to pose as the legitimate speaker; such voice recordings may be captured by the attacker, for example, through interception, eavesdropping, or through "voice phishing" or "vishing". In contrast, some embodiments may utilize a method which allows elimination or mitigation of such risks, for example, by performing intra-session voice variation liveness testing. For example, some embodiments may perform particular operations, in order to verify intra-session that the currently-captured voice sample is indeed uttered by a human, and is not generated by a machine or is not a recorded utterance.

Some embodiments may be used, for example, in order to authenticate (or un-authenticate) a user; to verify (or reject) a user's claim regarding his or her identity; to determine liveness (or non-liveness) of a user or of a source of audio; to determine whether a source of audio is human, or is a machine, or is a recording; and/or for other purposes.

Some embodiments may be used, for example, in order to authorize or un-authorize access of a user to a telephonic or voice-activated or voice-controlled banking system; to a to a telephonic or voice-activated or voice-controlled financial system (e.g., a bank account, a brokerage account, a securities account, or the like); to a telephonic or voice-activated or voice-controlled system of a utility company (e.g., an electricity company, a gas company, a water provider) or a government branch or a municipality branch; to a telephonic or voice-activated or voice-controlled system of a private organization or enterprise; to a telephonic or voice-activated or voice-controlled customer service center or customer support center; to a telephonic or voice-activated or voice-controlled bill payment service, credit card service, debit card service, or the like; to access and/or utilize a web-site, a web-based service, a web application; to initiate, perform and/or complete a transaction online, on the Internet, on the web, through a mobile or cellular phone, through a corded or cordless telephone; or the like.

Some embodiments may be used in conjunction with systems which do not necessarily utilize telephonic communications and/or wireless communications; for example, in conjunction with a system that requires a visitor to identify herself (using voice recognition methods) prior to gaining access to a secure location or to a restricted location; a system that requires a person to prove liveness at a particular time and/or date, or at pre-defined time or date-based intervals (e.g., a paroled criminal who may be required to call or visit a police station every day and identify himself using voice recognition); or other suitable systems.

Although portions of the discussion herein relate, for demonstrative purposes, to generation and/or computation and/or utilization of a score or a matching score (namely, able to take a value of a plurality of values, or of three or more values, or implemented as a discrete variable or a continuous variable), some embodiments may generate, compute and/or utilize a decision or a matching decision (e.g. able to take a binary value, or a true/false value, or a pass/fail value), instead of or in addition to a score or a matching score.

FIG. 1 is a schematic flow-chart of a method of speaker recognition, in accordance with some demonstrative embodiments.

In some embodiments, for example, the method includes a first stage of text-dependent enrollment, in which the speaker enrolls by saying a specific pass-phrase, or a set of specific pass-phrases, or one or more combinations of speech atoms (e.g., digits, letters and/or words) (block 105). This may include, for example, an enrollment process which may be similar to text-dependent or text-prompted voice biometrics. Then, a corresponding voice signature is computed and stored (block 110).

During a first authentication stage, the speaker is prompted to repeat one or more of the pass-phrases, or one or more random or pseudo-random combinations of speech atoms, depending on the type of audio provided during the enrollment stage (block 115).

The phrase or phrases obtained in block 115 are compared (block 120) with the voice signature created in block 110, and a similarity score, or a decision (e.g., accept or reject) is generated by the system (block 123). This authentication process may be similar to text-dependent or text-prompted voice biometrics.

Following the initial authentication phase, the speaker is prompted to repeat one or more random or pseudo-random sentences. These sentences may be random or pseudo-random, or may be selected at random or pseudo-randomly from a closed set of pre-defined sentences. The speaker is required to repeat exactly the same sentence prompted to him by the system (block 125). In some embodiments, this may be a text-independent phase of the process. In some embodiments, this may be a text-dependent phase, and/or a phase in which audio is acquired for purposes of training a text-independent voice-print from the acquired audio, and/or a liveness detection audio acquisition phase.

Using an Automatic Speech Recognition (ASR) process or other suitable process, the audio recorded in block 125 goes through an utterance validation process, which checks whether or not the speaker indeed repeated the requested sentence or sentences (block 130). A score or a decision regarding this matching is produced (block 135).

Using a text-independent voice biometrics process, the audio collected in the first authentication phase (block 115) and in the second authentication phase (block 125) are compared (block 140); and a similarity score or decision is produced (block 145). This comparison may be performed, for example, by training a text-independent voice signature using the audio collected in block 115, and evaluating whether or not the voice recorded in block 125 comes from the same speaker. In some embodiments, this operation may be performed both ways, for example, by training a text-independent voice signature using the audio collected in block 125 and evaluating whether or not the voice recorded in block 115 comes from the same speaker. The similarity scores of both comparisons may be combined (or averaged, or otherwise taken into account) for increased confidence and/or accuracy.

A liveness detection score and/or decision are produced (block 150), for example, by fusion of the outcomes (scores and/or decisions) from block 123, block 135, and block 145 (which by itself may be based on two comparisons, or two scores, or two decisions).

In some embodiments, for example, a high or relatively high score in block 123 may indicate that the authentication phrase is the same as the enrollment phrase, and was uttered by the same speaker. In some embodiments, for example, a high or relatively high score in block 135 may indicate that the speaker repeated the random or pseudo-random phrase as requested by the system. In some embodiments, a high or relatively high score in block 145 may indicate that the same speaker provided the authentication phrase (in the first portion of the authentication process) as well as the random phrase (in the second portion of the authentication process). In some embodiments, a fusion of these three scores may be a good indication that the speaker interacting with the system is both "alive" and authentic, and is not a fraudster or an attacker using pre-recorded voice samples. In some embodiments, fusion of the scores or decisions may be performed in one or more suitable ways, for example: voting (e.g., counting the number of positive decisions), or weighted combination of scores which takes into account the confidence level of each individual score.

In some embodiments, the method may allow one or more advantages and/or benefits. For example, the method may rely on text-dependent (or prompted) voice biometrics technology for primary authentication; and text-dependent technology generally provides higher level of accuracy compared to text-independent technology.

Additionally or alternatively, the method may substantially eliminate the need to collect a text-independent voice signature from an authentic speaker prior to the call in which the user attempts to access his or her account or voice-activated service. This is in contrast with conventional systems which may rely on existing text-independent voice signatures which require lengthy, and sometimes multi-session or multi-channel, enrollment procedures for robustness.

Figure 2:
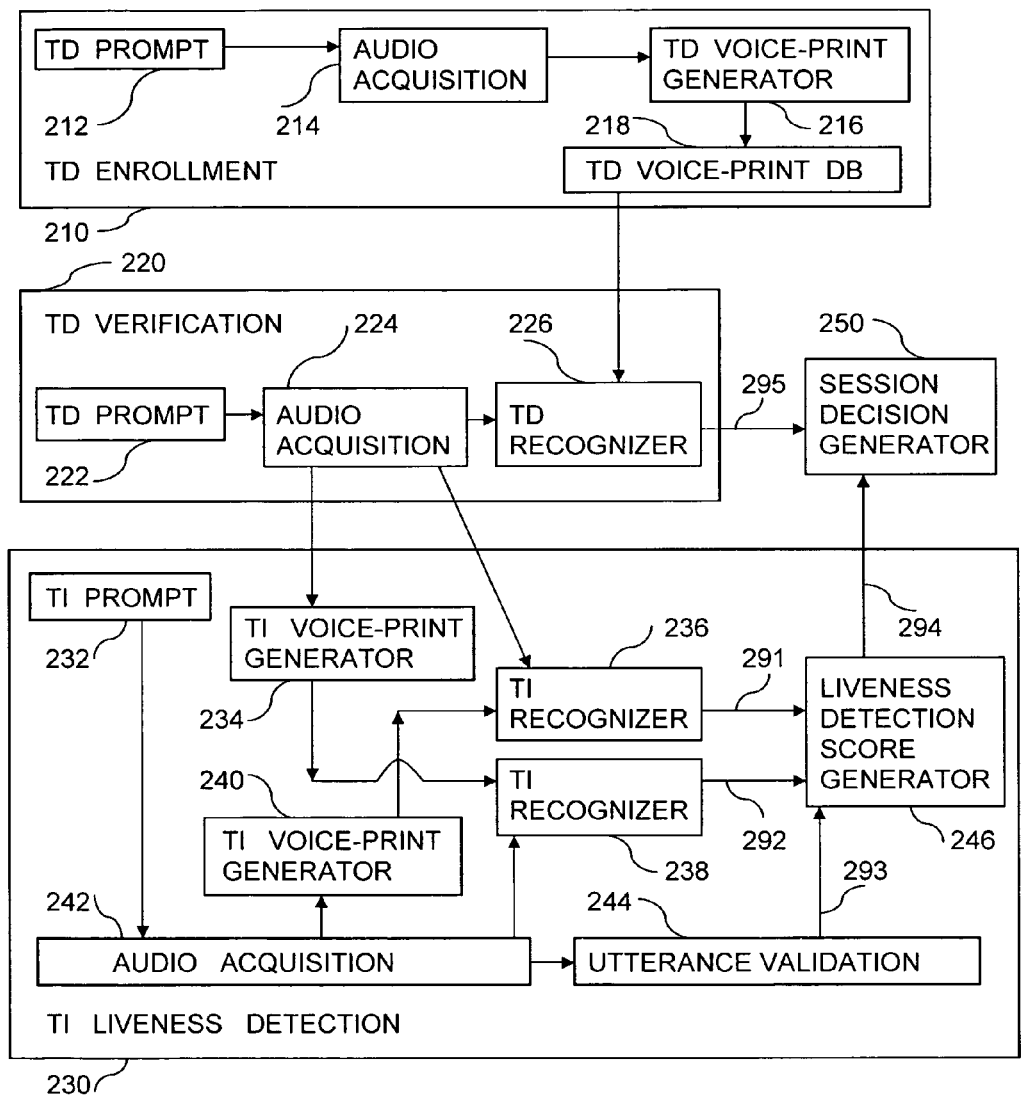
FIG. 2 is a schematic flow-chart of a process of speaker recognition, in accordance with some demonstrative embodiments.

Additionally or alternatively, the method may provide increased accuracy for speaker recognition and authentication, since the audio tested is recorded in a single session that is performed from a single fixed communication channel, and this may significantly reduce the overall "false alarm" rate for liveness detection. In contrast, some conventional systems may be utilize multi-session communications which may be performed using two or more communication channels— e.g., a relatively "clear" land-line or wired telephone, a semi-clear cordless telephone, a noisy cellular phone, or the like. It is clarified that the term "session" as used herein may include, for example, an interaction over a single communication channel or medium or device (e.g., a cellular phone, a land-line telephone, a corded telephone, a cordless phone, a speakerphone, or the like), the interaction typically occurring over a relatively short time-period (e.g., measured in seconds or minutes, and not hours). In some embodiments, two or more consecutive sessions may be regarded as a single session (e.g., if a telephone conversation got disconnected and the user re-dialed to resume). In some embodiments, liveness detection may also be referred to as aliveness detection, liveness determination, or liveness estimation Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution FIG. 2 is a schematic flow-chart of a process of speaker recognition, in accordance with some demonstrative embodiments. The method may include, for ex ample, a text-dependent enrollment phase 210; followed by a text-dependent verification phase 220 and a text-independent liveness detection phase 230.

In the text-dependent enrollment phase 210, the user is prompted (block 212) to provide a text-dependent audio input for enrollment, using an audible prompt, a visual prompt, a written prompt, or the like. Audio acquisition is performed (block 214); and a text-dependent voice-print generator generates a voice-print (block 216) which is stored in a text-dependent voice-print database 218.

In the text-dependent verification phase 220, the user is prompted (block 222) to provide a text-dependent audio input for verification. Audio acquisition is performed (block 224); and a text-dependent recognizer (block 226) generates a text-dependent verification score, based on the verification audio acquired in block 224 and based on the voice-print generated in block 216.

In the text-independent liveness detection phase 230, the user is prompted to say one or more sentences (e.g., selected randomly from a large set of pre-defined sentences) (block 232). Audio acquisition is performed (block 242), and the acquired audio undergoes utterance validation (block 244) to validate that the speaker indeed said the sentence(s) prompted to him. An utterance validation score is transferred to a liveness detection score and decision generator (block 246).

The liveness detection score and decision generator (block 246) further receives as input a text-independent verification score generated by a text-independent recognizer (block 236), which operates based on: the text-dependent audio acquired in block 224, and a text-independent voice-print that was generated (block 240) based on the text-independent audio acquired in block 242.

The liveness detection score and decision generator (block 246) further receives as input a text-independent verification score generated by a text-independent recognizer (block 238), which operates based on: the text-independent audio acquired in block 242, and a text-independent voice-print that was generated (block 234) based on the text-dependent phase audio acquired in block 224.

Based on the three inputs received by the liveness detection score and decision generator (block 246), or based on a pre-defined combination thereof or weighting thereof, the liveness detection score and decision generator (block 246) generates a liveness detection score.

The liveness detection score, together with the text-dependent verification score generated in block 226, are utilized by a session decision generator (block 250) in order to generate a decision with regard to the authenticity and the liveness of the speaker.

In some embodiments, for example, arrow 291 indicates transfer of a text-independent verification score; arrow 292 indicates transfer of a text-independent verification score; arrow 293 indicates transfer of an utterance validation score; arrow 294 indicates transfer of a liveness detection score; and arrow 295 indicates transfer of a text-dependent verification score.

Figure 3:
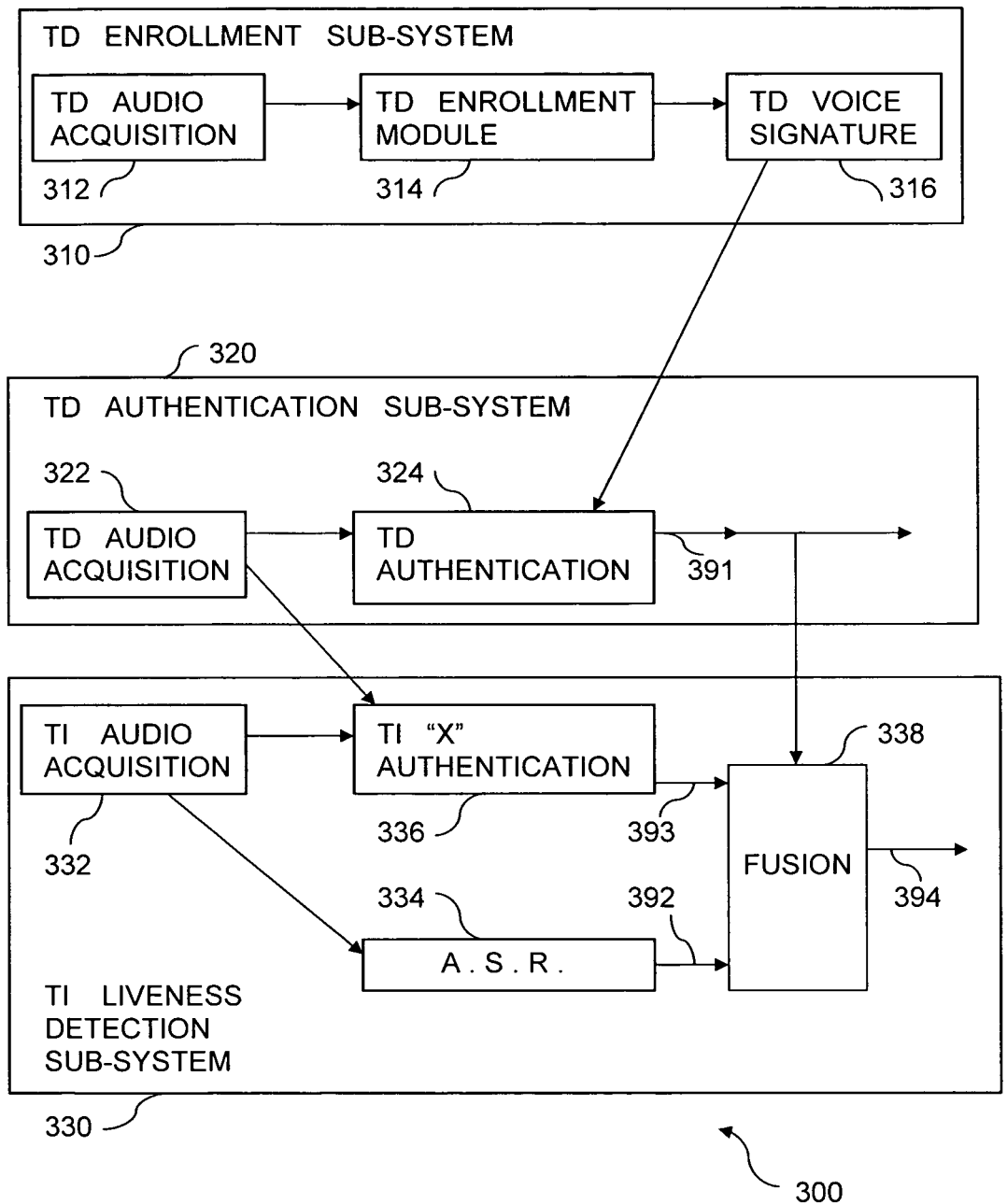
FIG. 3 is a schematic block diagram illustration of a system in accordance with some demonstrative embodiments.

Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution FIG. 3 is a schematic flow-chart of a system 300 for speaker recognition, in accordance with some demonstrative embodiments. System 300 may include, for example, a text-dependent enrollment sub-system 310; as well as a text-dependent authentication sub-system 320 and a text-independent liveness detection sub-system 330.

The text-dependent enrollment sub-system 310 may include, for example, a text-dependent audio acquisition module 312, associated with a text-dependent enrollment module 314 able to produce a text-dependent voice signature 316.

The text-dependent authentication sub-system 320 may include, for example, a text-dependent audio acquisition module 322, associated with a text-dependent authentication module 324. The text-dependent authentication module 324 may receive as input: the text-dependent voice signature 316, and the text-dependent audio acquired by the text-dependent audio acquisition module 322. The text-dependent authentication module 324 may generate a text-dependent score (arrow 391).

The text-independent liveness detection sub-system 330 may include, for example, a text-independent audio acquisition module 332. The acquired text-independent audio may be provided to an Automatic Speech Recognition (ASR) module 334, able to generate an ASR score (arrow 392). The acquired text-independent audio, acquired by the text-independent audio acquisition module 332, may further be provided to a text-independent "X"-authentication module 336, able to generate a text-independent score (arrow 393). In some-embodiment, the "X"-authentication module 336 may be, for example, similar to module 400 of FIG. 4.

The text-dependent score (arrow 391), as well as the ASR or utterance validation score (arrow 392) and the text-independent score (arrow 393) may be received by a fusion module 338. The fusion module 338 may utilize these scores, optionally in accordance with a pre-defined formula or weighting scheme, in order to generate a liveness score (arrow 394).

Figure 4:
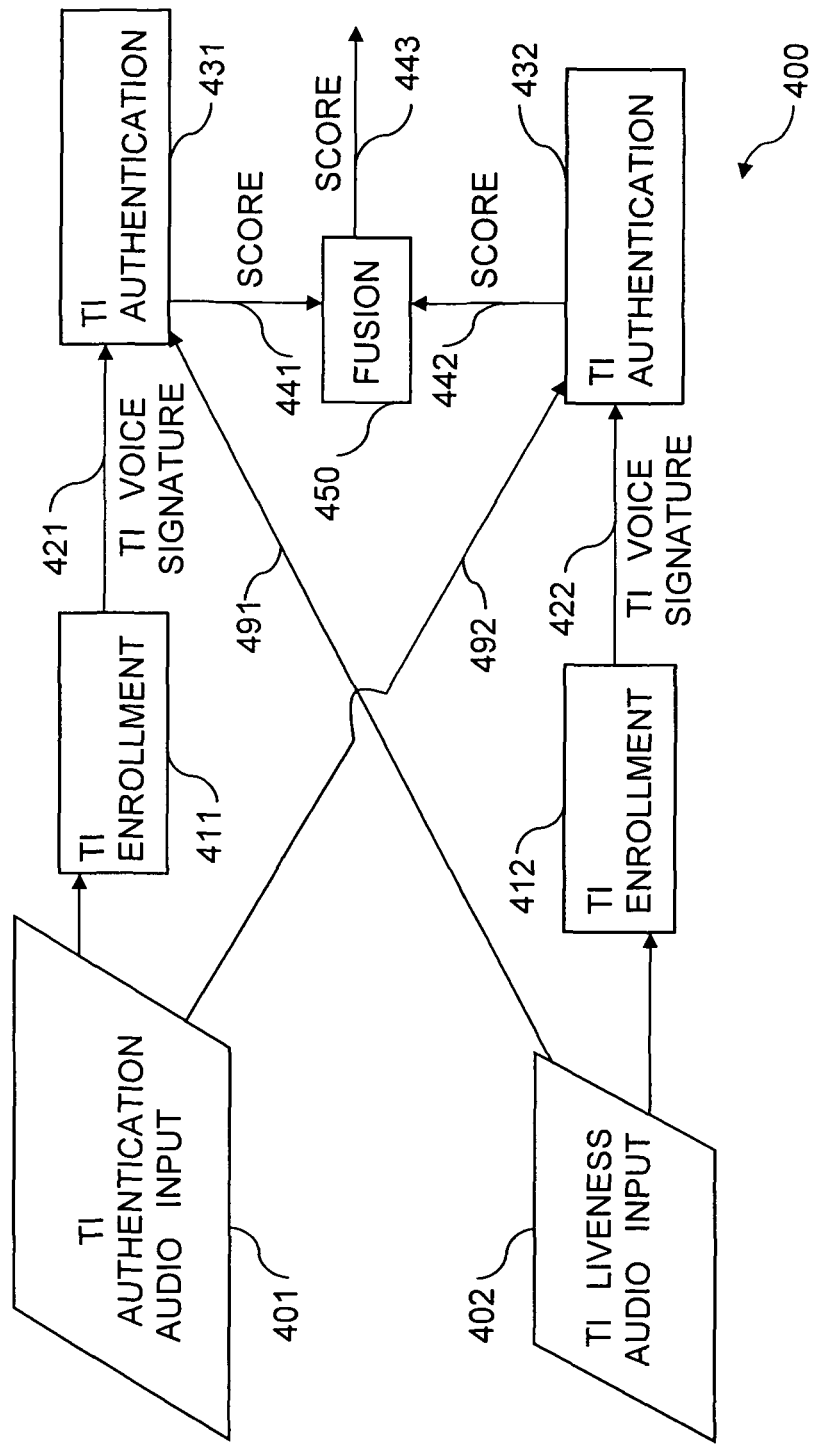
FIG. 4 is a schematic flow-chart of a text-independent authentication module, in accordance with some demonstrative embodiments.

FIG. 4 is a schematic flow-chart of a text-independent authentication module 400, in accordance with some demonstrative embodiments. The text-independent authentication module 400 may be a demonstrative implementation of the text-independent "X"-authentication module 336 of FIG. 3.

In some embodiments, for example, the text-independent authentication module 400 may compute a text-independent voice signature from text-dependent authentication audio; and may compare the text-independent voice signature with the text-independent liveness detection audio. Optionally, this process may further be performed in the other way, and the results may be combined, in order to increase accuracy and/or confidence level.

The text-independent authentication module 400 may receive as input, for example: a text-dependent audio input 401 for authentication purposes, and a text-independent audio input 402 for liveness determination purposes.

The text-dependent audio input 401 may be used by a text-independent enrollment module 411 to produce a text-independent voice signature (arrow 421); which may be used, together (arrow 491) with the text-independent audio input 402, by a text-independent authentication module 431 (or recognizer module) to generate a first matching score (arrow 441) or a first interim score.

Similarly, the text-independent audio input 402 may be used by a text-independent enrollment module 412 to produce a text-independent voice signature (arrow 422); which may be used, together (arrow 492) with the text-dependent audio input 401, by a text-independent authentication module 432 (or recognizer module) to generate a second matching score (arrow 442) or a second interim score.

The first and second matching scores (or interim scores) (indicated by arrows 441 and 442, respectively) may be received by a fusion module 450, or other suitable score generator or combinatory, which may utilize them to generate a text-independent combined matching score (arrow 443).

Some embodiments may utilize, or may include, a wired or wireless communication network, for example, in order to transfer or receive speech samples or other audio samples, as well as other analog and/or digital data or signals. In some embodiments, the communication network may be or may include, for example, a global communication network, the Internet, the World Wide Web, a wired network, a wireless network, a combination of one or more wired networks and/or one or more wireless networks, a shared access medium, or the like. In some embodiments, the communication network may include one or more wired and/or wireless communication networks, for example, an a-synchronic or asynchronous wireless network, a synchronic wireless network, a managed wireless network, a non-managed wireless network, a burstable wireless network, a non-burstable wireless network, a scheduled wireless network, a non-scheduled wireless network, or the like.

In some embodiments, one or more of the systems or sub-systems or components or modules described herein, may be implemented using suitable hardware components and/or software components, for example, a processor, an input unit, an output unit, a memory unit, a storage unit, and a communication unit.

The processor may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. The processor executes instructions, for example, of an Operating System (OS) or of one or more applications.

The input unit includes, for example, a keyboard, a keypad, a mouse, a touch-pad, a touch-screen, a joystick, a track-ball, a stylus, a microphone, a speakerphone, a unit or device able to capture or acquire or record voice and/or speech and/or audio, or other suitable pointing unit or input device. The output unit includes, for example, a monitor, a screen, a touch-screen, a Cathode Ray Tube (CRT) display unit, a Liquid Crystal Display (LCD) display unit, a plasma display unit, one or more audio speakers or earphones, or other suitable output devices.

The memory unit includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. The storage unit includes, for example, a hard disk drive, a floppy disk drive, a Compact Disk (CD) drive, a CD-ROM drive, a Digital Versatile Disk (DVD) drive, an internal or external database or repository, or other suitable removable or non-removable storage units. The memory unit and/or storage unit, for example, may store data processed by the system The communication unit includes, for example, a wired or wireless transceiver, a wired or wireless modem, a wired or wireless Network Interface Card (NIC) or adapter, or other unit suitable for transmitting and/or receiving communication signals, blocks, frames, transmission streams, packets, messages and/or data. Optionally, the communication unit includes, or is associated with, one or more antennas or one or more sets of antennas. In some embodiments, such antenna may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In some embodiments, some or all of the components or modules described herein may be enclosed in a common housing or packaging, and may be interconnected or operably associated using one or more wired or wireless links. In other embodiments, such components or modules may be distributed among multiple or separate devices or locations.

In some embodiments, the system (or portions thereof) may be utilized and/or accessed by, for example, a desktop computer, a laptop computer, a notebook computer, a tablet computer, a PDA device, a cellular phone, a mobile phone, a hybrid device (e.g., combining one or more cellular phone functionalities with one or more PDA device functionalities), a portable audio player, a portable video player, a portable audio/video player, a portable media player, a portable device having a touch-screen, a relatively small computing device, a non-desktop computer or computing device, a portable device, a handheld device, a "Carry Small Live Large" (CSLL) device, an Ultra Mobile Device (UMD), an Ultra Mobile PC (UMPC), a Mobile Internet Device (MID), a Consumer Electronic (CE) device, an "Origami" device or computing device, a device that supports Dynamically Composable Computing (DCC), a context-aware device, or the like.

Some embodiments may utilize client/server architecture, publisher/subscriber architecture, fully centralized architecture, partially centralized architecture, fully distributed architecture, partially distributed architecture, scalable Peer to Peer (P2P) architecture, or other suitable architectures or combinations thereof.

The terms "plurality" or "a plurality" as used herein include, for example, "multiple" or "two or more". For example, "a plurality of items" includes two or more items.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the following claims are intended to cover all such modifications, substitutions, changes, and equivalents.

What is claimed is:

1. A method comprising:
generating, with a processor, a first matching score based on a comparison between: (a) a voice-print from a first text-dependent audio sample received at an enrollment stage, and (b) a second text-dependent audio sample received at an authentication stage;

generating, with a processor, a second matching score based on a text-independent audio sample; and generating, with a processor, a liveness score by taking into account at least the first matching score and the second matching score, wherein generating, second matching score comprises:

generating the second matching score based on a comparison between: (i) a voice-print from said second text-dependent audio sample received at said authentication stage, and (ii) said text-independent audio sample received at a liveness detection stage.

2. The method of claim 1, wherein generating the second matching score comprises:

generating a first interim score based on a comparison between: (1) the text-independent audio sample received at said authentication stage, and (2) a text-independent voice-print of said text-independent audio sample received at said liveness detection stage;

generating a second interim score based on a comparison between: (A) the text-independent audio sample received at said liveness detection stage, and (B) a text-independent voice-print of said text-independent audio sample received at said authentication stage; and generating said second matching score based on at least said first interim score and said second interim score.

3. The method of claim 1, further comprising:

generating, with a processor, an utterance validation score based on said text-independent audio sample received at said liveness detection stage.

4. The method of claim 3, wherein generating the liveness score comprises:

generating the liveness score by taking into account at least the first matching score, the second matching score, and the utterance validation score.

5. The method of claim 4, wherein generating the utterance validation score comprises:

applying an Automatic Speech Recognition algorithm to generate said utterance validation score.

6. The method of claim 1, wherein at least one of the first matching score and the second matching score comprises a binary value.

7. The method of claim 1, wherein at least one of said enrollment stage, said authentication stage or said liveness detection stage is performed over a telephonic communication channel.

8. The method of claim 1, wherein generating the second matching score based on the text-independent audio sample comprises:

pseudo-randomly selecting a phrase from a plurality of pre-defined phrases; and prompting a user to say said phrase.

9. At least one non-transitory machine-readable medium storing instructions that, when executed by at least one processor, cause the at least one processor to perform a method comprising:

generating a first matching score based on a comparison between: (a) a voice-print from a first text-dependent audio sample received at an enrollment stage, and (b) a second text-dependent audio sample received at an authentication stage;

generating a second matching score based on a text-independent audio sample; and generating a liveness score by taking into account at least the first matching score and the second matching score, wherein generating the second matching score comprises:

generating the second matching score based on a comparison between: (i) a voice-print from said second text-dependent audio sample received at said authentication stage, and (ii) said text-independent audio sample received at a liveness detection stage.

10. The at least one machine-readable medium of claim 9, wherein generating the second matching score comprises:

generating a first interim score based on a comparison between: (1) the text-independent audio sample received at said authentication stage, and (2) a text-independent voice-print of said text-independent audio sample received at said liveness detection stage;

generating a second interim score based on a comparison between: (A) the text-independent audio sample received at said liveness detection stage, and (B) a text-independent voice-print of said text-independent audio sample received at said authentication stage; and generating said second matching score based on at least said first interim score and said second interim score.

11. The at least one machine-readable medium of claim 9, wherein the method further comprises generating an utterance validation score based on said text-independent audio sample received at said liveness detection stage.

12. The at least one machine-readable medium of claim 11, wherein generating the liveness score comprises taking into account at least the first matching score, the second matching score, and the utterance validation score.

13. The at least one machine-readable medium of claim 12, wherein generating the utterance validation score comprises applying an Automatic Speech Recognition algorithm to generate said utterance validation score.

14. The at least one machine-readable medium of claim 9, wherein at least one of the first matching score and the second matching score comprises a binary value.

15. The at least one machine-readable medium of claim 9, wherein at least one of said enrollment stage, said authentication stage or said liveness detection stage is performed over a telephonic communication channel.

16. The at least one machine-readable medium of claim 9, wherein the second matching score based on the text-independent audio sample comprises:

pseudo-randomly selecting a phrase from a plurality of pre-defined phrases, and prompting a user to say said phrase.

17. An apparatus comprising:

at least one processor; and at least one machine-readable medium configured to store instructions, which, when executed by the at least one processor, cause the apparatus to implement a speaker recognition module comprising:

a text-dependent enrollment module to capture a text-dependent audio sample during an enrollment stage, and to generate from the text-dependent audio sample a text-dependent voice signature during said enrollment stage;

a text-dependent audio acquisition module to acquire a text-dependent audio sample during an authentication stage;

a text-dependent authentication module to generate a first score based on a comparison between: (a) the text-dependent voice signature generated during said enrollment stage, and (b) the text-dependent audio sample acquired during said authentication stage;

a text-independent audio acquisition module to acquire a text-independent audio sample during a liveness detection stage by prompting a user to say a phrase selected pseudo-randomly from a pool of pre-defined phrases;

a text-independent authentication module to generate a second score based at least on a comparison between: (1) said text-independent audio sample acquired during said liveness detection stage, and (2) a text independent voice signature generated from said text-dependent audio sample acquired during said authentication stage;

an utterance validation module to generate a validation score corresponding to validity of said text-independent audio sample acquired during said liveness detection stage; and a fusion module to generate a liveness detection score based on at least said first score, said second score, and said validation score, wherein the text-independent authentication module comprises:

a first text-independent enrollment module to generate a first text-independent voice print based on a text-dependent audio sample acquired during said authentication stage;

a second text-independent enrollment module to generate a second text-independent voice print based on the text-independent audio sample acquired during the liveness detection stage;

a first text-independent authentication unit to generate a first interim matching score based on a comparison between: (i) the first text-independent voice print, and (ii) the text-independent audio sample acquired during the liveness detection stage;

a second text-independent authentication unit to generate a second interim matching score based on a comparison between: (i) the second text-independent voice print, and (ii) the text-independent audio sample acquired during the authentication stage; and a combination module to generate said second score based on the first interim matching score and the second interim matching score.

* * * * *